United States Patent
Gallery et al.

(10) Patent No.: US 6,381,613 B1
(45) Date of Patent: Apr. 30, 2002

(54) DISTRIBUTED DATABASE ACCESS VIA VIRTUAL ENVIRONMENT BROWSER

(75) Inventors: Richard D. Gallery, Dublin (IE); Michael K. Verhagen, Horley (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/188,748

(22) Filed: Nov. 9, 1998

(30) Foreign Application Priority Data

Nov. 10, 1997 (GB) .............................................. 9723654

(51) Int. Cl.[7] .............................................. G06F 17/30
(52) U.S. Cl. ...................... 707/104.1; 707/10; 345/202; 345/419; 345/798; 711/136; 711/118; 711/119
(58) Field of Search ................... 707/104, 10; 345/419, 345/202, 748; 711/136, 118, 119

(56) References Cited

U.S. PATENT DOCUMENTS

| | | | | |
|---|---|---|---|---|
| 4,719,568 A | * | 1/1988 | Carrubba et al. ............ | 364/200 |
| 4,817,050 A | | 3/1989 | Komatsu et al. | |
| 5,636,355 A | * | 6/1997 | Ramakrishnan et al. .... | 395/440 |
| 5,815,156 A | * | 9/1998 | Takeuchi ..................... | 345/419 |
| 5,956,039 A | * | 9/1999 | Woods et al. ................ | 345/419 |
| 5,999,944 A | * | 12/1999 | Lipkin ......................... | 707/104 |
| 6,049,850 A | * | 4/2000 | Vishlitzky et al. .......... | 711/136 |
| 6,058,397 A | * | 5/2000 | Barrus et al. ................ | 707/104 |
| 6,073,076 A | * | 6/2000 | Crowley et al. ............ | 701/208 |
| 6,073,168 A | * | 6/2000 | Mighdoll et al. ........... | 709/217 |
| 6,084,589 A | * | 7/2000 | Shima ......................... | 345/419 |
| 6,088,698 A | * | 7/2000 | Lipkin ......................... | 707/10 |
| 6,111,566 A | * | 8/2000 | Chiba et al. ................. | 345/202 |

FOREIGN PATENT DOCUMENTS

| | | | | |
|---|---|---|---|---|
| EP | 0591739 A2 | 4/1994 | ........... | G06F/15/64 |
| EP | 0697613 A2 | 2/1996 | ........... | G02B/27/01 |
| EP | 0753836 A2 | 1/1997 | ........... | G06T/15/00 |

OTHER PUBLICATIONS

"Building VRML World" Osborne/McGraw–Hill 1997 p. 26–31.

* cited by examiner

*Primary Examiner*—John Breene
*Assistant Examiner*—Khanh Pham
(74) *Attorney, Agent, or Firm*—Peter Verdonk

(57) ABSTRACT

A data processing apparatus configured as a browser (70) is described for use with a distributed database management utility (72) which handles the accessing of data defining virtual environments via the Internet/World Wide Web (74). Both browser (70) and management utility (72) maintain copies of data files obtained via the Web and passed to the browser, with a memory management stage (80) detecting when apparatus memory reaches a predetermined level of fullness. Based on a stored and system-updated table (84) identifying the passing of data files from management utility to browser, the memory manager (80) identifies which of the management utility held copies of the files to delete in order to create memory space.

8 Claims, 3 Drawing Sheets

DISTRIBUTED DATABASE ACCESS VIA VIRTUAL ENVIRONMENT BROWSER

BACKGROUND OF THE INVENTION

The present invention relates to apparatus for accessing, from a remote source, data defining a graphical representation of a virtual environment, with the user being enabled to select one from a plurality of available virtual environments and the apparatus having means for rendering a display of the selected virtual environment from one or more viewpoints.

A description of a service providing a virtual environment (or cyber-space) accessible by remote users is given in European patent application EP-A-0 697 613 (Sony Corp.). The system described includes a server providing a virtual reality space, and user terminals connected to the server via a high-speed communications network (using optical fibers or the like). In operation, the server maintains a number of virtual environments and supports many differing terminal types by the use of conversion objects between information objects and user objects: the conversion objects provide individually tailored translation for communications back and forth between each type of terminal and each configuration of virtual environment supported.

A particular benefit arises when the format of data storage and representation for virtual environments is at least partially standardized, allowing for greater interchange between systems of different manufacturers as well as a reduction in the necessity for individually tailored translation utilities. With at least partial standardization, the necessary configuration of a browser for accessing such data, whether in a hardware or software implementation or a mixture of the two, becomes simpler.

A notable example of standardization in the field of data defining virtual environments is the so-called Virtual Reality Modeling Language (VRML) as described, for example, in the VRML standard, version 2.0, issued as ISO/IEC WD14772 on Aug. 4th 1996. VRML is a file format for describing interactive three-dimensional objects and worlds to be experienced on the Internet/World Wide Web and it is generally analogous to the way HTML (HyperText Markup Language) is used to describe documents for transmission over the Internet. A number of examples of VRML browsers are discussed in "Building VRML Worlds" by E. Tittel et al, published by McGraw Hill 1997, ISBN 0-07-882233-5, at pages 26 to 31. The functionalities of the different browsers, over and above the basic required for conformity, depend to a large extent on their target host system and the likely uses of the same, as well as whether they are purpose-built/ written or whether they are modifications of earlier utilities.

It is an object of the present invention to provide a user operable means for browsing data defining a virtual environment and rendering a view of the same, having improved efficiency in the handling of data obtained from one or more remote sources for use in the generation of representations of virtual environments.

In accordance with the present invention there is provided a data processing apparatus configured as a virtual environment data browser, the apparatus comprising a processor coupled with at least first storage means and data network interface means capable of receiving data defining a virtual environment and objects therein when coupled to a data network including a source of such data, the apparatus further comprising user input means and being configured to periodically generate an image based on said data defining the virtual environment and objects and from a viewpoint at a location and with an orientation in said virtual environment determined at least partially by input from said user input means; characterized in that further storage means are provided with the apparatus further comprising memory management means configured to place in said further storage means a copy of each data file received via the network, to check within said further storage means for data files before calling for them via the network, and to determine both required and available data storage capacity for at least the first and further storage means of the apparatus and, when the required capacity exceeds a predetermined level, to clear from said further storage means those data files also passed to the first storage means.

Since accesses to remotely-stored virtual environments will typically involve downloading of a number of related data files (for example texture files for all surfaces which may be encountered within the virtual environment) and not all such files will be required at any given time, by providing the further memory (which may be a partitioned area of the first) to hold copies of received files, access times may be reduced through checking whether a local copy of a required file already exists in the further storage means before calling for it from across the network. To ensure that the duplication of locally held copies of those files also passed to the first memory means when required for rendering does not require unrealistically large amounts of available memory, the apparatus memory manager means not only detects when memory fullness is reaching critical levels, but also determines which duplicate files may be deleted to free memory by identification of those already passed to the first memory whose continued usefulness has thereby become suspect.

As a feature of its operation, the memory management means is suitably configured to maintain and periodically update a table identifying, as respective entries in the table, data files required for generation of said image. In this table of data file entries, the memory management means may record, for each table entry, an indication of the respective data files source: for data files held within one or other area of memory of the apparatus, this indication of the respective data files source may comprise a memory address for the data file, wherein for data files held at remote locations accessible via said data network, the indication of the respective data files source may comprises a network address and such accessing information (for example full title, passwords etc.) as is required for acquiring that data file from its respective remote location.

In addition to the foregoing, the memory management means may also include in the table (for each entry) an indication as to whether or not the respective data file has been stored in the first storage means, that is to say whether it has actually been called up for use by the browser. As mentioned above, the memory manager not only detects when memory fullness is reaching critical levels (indicated when the current memory use is in the range of 60 to 100% of available storage capacity) but also determines which files may be deleted from the further storage means to free memory (for example when memory fullness is 90% of available storage capacity). The determination of which files to clear may simply be made by checking the indicators for whether or not the data files have been stored in the first storage means.

BRIEF DESCRIPTION OF THE DRAWINGS

Further features and advantages of the present invention will become apparent from reading of the following description of preferred embodiments of the invention, described by way of example only, with reference to the accompanying drawings, in which.

DETAILED DESCRIPTION OF THE INVENTION

Figure 1:
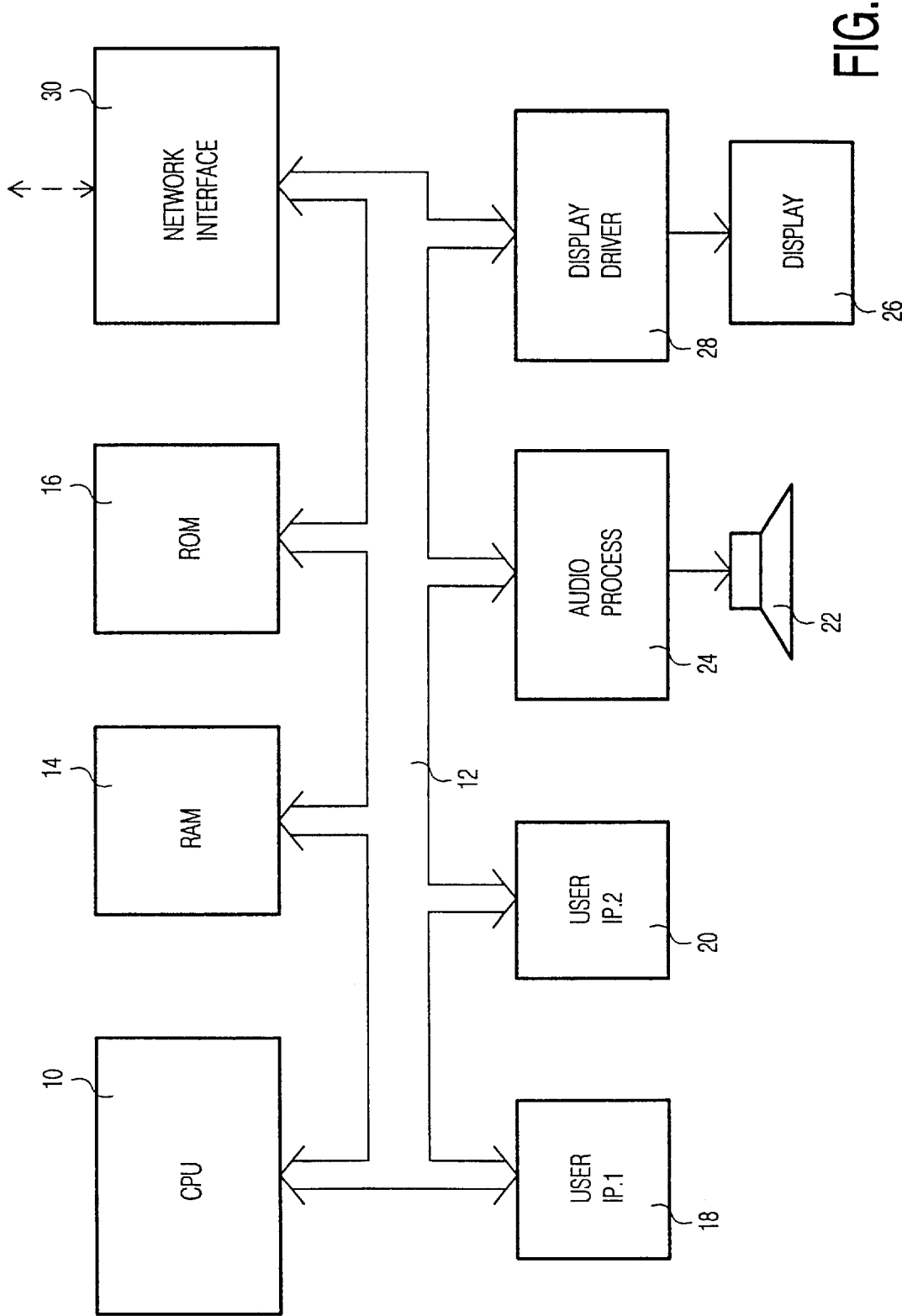
FIG. 1 is a block schematic diagram of a data processing system suitable to embody the present invention.

FIG. 1 represents a data processing system, such as a personal computer, which acts as host for a software utility that configures the system as both a browser for data defining a virtual environment, and a distributed database management system for handling of obtaining the required data from one or several remote locations. The system comprises a central processing unit (CPU) 10 coupled via an address and data bus 12 to random-access (RAM) and read-only (ROM) memory devices 14, 16. The capacity of these memory devices may be augmented by providing the system with means to read from additional memory devices, such as a CD-ROM.

Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24; in addition to providing amplification, the audio processing stage is preferably also configured to provide a signal processing capability under the control of the CPU 10 to allow the addition of sound treatments such as echo to existing audio data. Video output from the system is presented on display screen 26 driven by display driver stage 28 under control of the CPU 10.

A further source of data for the system is via online link to remote sites, for example via the Internet, to which end the system is provided with a network interface 30 coupled to the bus 12. The precise construction of the interface is not an essential feature of the present invention, although it will be recognized that the interface configuration will depend on the type of data network to which the system is to be coupled: for example, where the system is for use by a private home user, the data link is likely to be a telephone connection to a local service provider. In such a case, the interface 30 will suitably incorporate a modem. For other types of data link, such as an ISDN connection, the interface will be configured accordingly.

Figure 2:
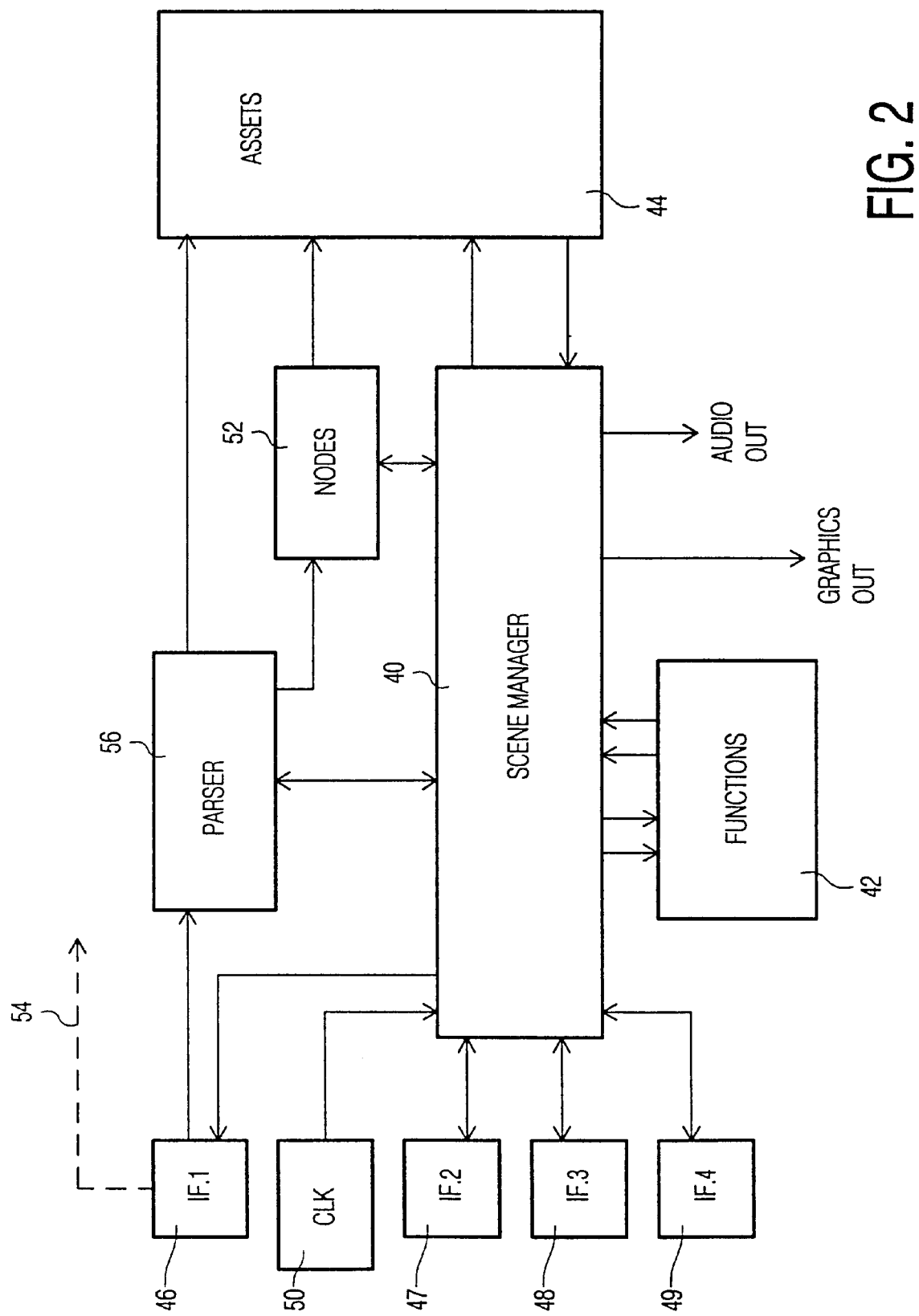
FIG. 2 represents the component functions of a browser, as hosted by the system of FIG. 1, and embodying the invention.

Turning now to FIG. 2, the inter-relationship of a number of functions assembled to configure a part of the hardware of FIG. 1 as a browser is illustrated. The functions in the example illustrated are particularly suited for browsing virtual environments defined in accordance with the VRML standard, version 2.0, issued as ISO/IEC WD14772 on Aug. 4th 1996, although it will be understood that the present invention is not restricted by, or limited to, conformance with this standard. Only those components and functions of the browser as are required for understanding of the present invention will be described in detail: a fuller description of this browser configuration and its operation is given in the commonly assigned United Kingdom patent application 971101.9, filed May 29th 1997 and unpublished at the priority date of the present application.

The browser is based around a scene manager 40 coupled with respective stores for functions 42, assets 44, and a hierarchy of scene nodes 52. In terms of the hardware of FIG. 1, the function, asset and hierarchy stores will generally be held in RAM 14, although some of the assets (for example standardized texture maps) may be provided in fast local caches, or via offline storage such as CD-ROM. The browser implementation program is suitably held in ROM 16, optionally linked to the boot-up utility of the system. Also coupled with the scene manager are four interfaces (IF.1-IF.4) 46–49 and a clock 50. The first of the four interfaces 46 corresponds in part to interface 30 of FIG. 1 in that it represents the source of data received via the Internet: as represented by dashed line 54, the received data may be passed on from the interface to other (not shown) destinations, such as a further browser for HTML content in the received data. The first interface is the general arrival point for the data defining the virtual environment and, as such, it may also receive data from more local sources such as storage on the system RAM (14; Fig.1) or a CD-ROM.

From the first interface, the data passes to a parsing stage 56 which divides it into data defining or relating to assets (which data is then passed to store 44) and data defining or relating to the run-time node hierarchy (which data is then passed to store 52). In operation, it will generally be the case that only the data required (in terms of texture, co-ordinates etc) immediately or in the short term will actually be loaded up by the browser.

The second interface 47 is an external API (application programming interface) which may suitably comprise a set of interfacing subroutines such as to enable multiple-user extensions to the system, for example to support two or more users having respective viewpoints within a common environment.

The third interface 48 is for operational segments used to program behavior in a scene: these segments are referred to in VRML as script nodes. The script nodes contain a program module which, in response to a change or user action within a scene, effect a change somewhere else in the scene depending on the contents of the program module. The program modules may suitably contain Java® language segments (Java is the object-oriented platform-independent and general-purpose programming environment developed by Sun Microsystems Inc). The third interface 48 provides a path to a Java interpreter which converts the Java segments from their platform independent form to a form recognized by the host system.

The fourth interface 49 handles the passing of signals from (and in some instances to) the user input devices.

The functions (functional modules) held in store 42 include an audio manager, MPEG decoder, features for node run-time implementations (such as interpolators), collision detectors, three-dimensional pickers, viewpoint control and routing mechanisms.

The assets within store 44 are the basic building blocks and operational features from which the virtual environment is built up. These assets include three-dimensional geometry defining the configuration and relative location of the polygons to be assembled for the virtual environment, textures for mapping onto polygon surfaces during rendering, audio data, Java® code, user interaction data and/or MPEG data.

The further store for run-time structures 52 contains the VRML scene graph together with routes to allow dynamic behavior. The scene graph is a hierarchical file specifying the connections between the various geometrical components making up an object within the virtual environment.

Figure 3:
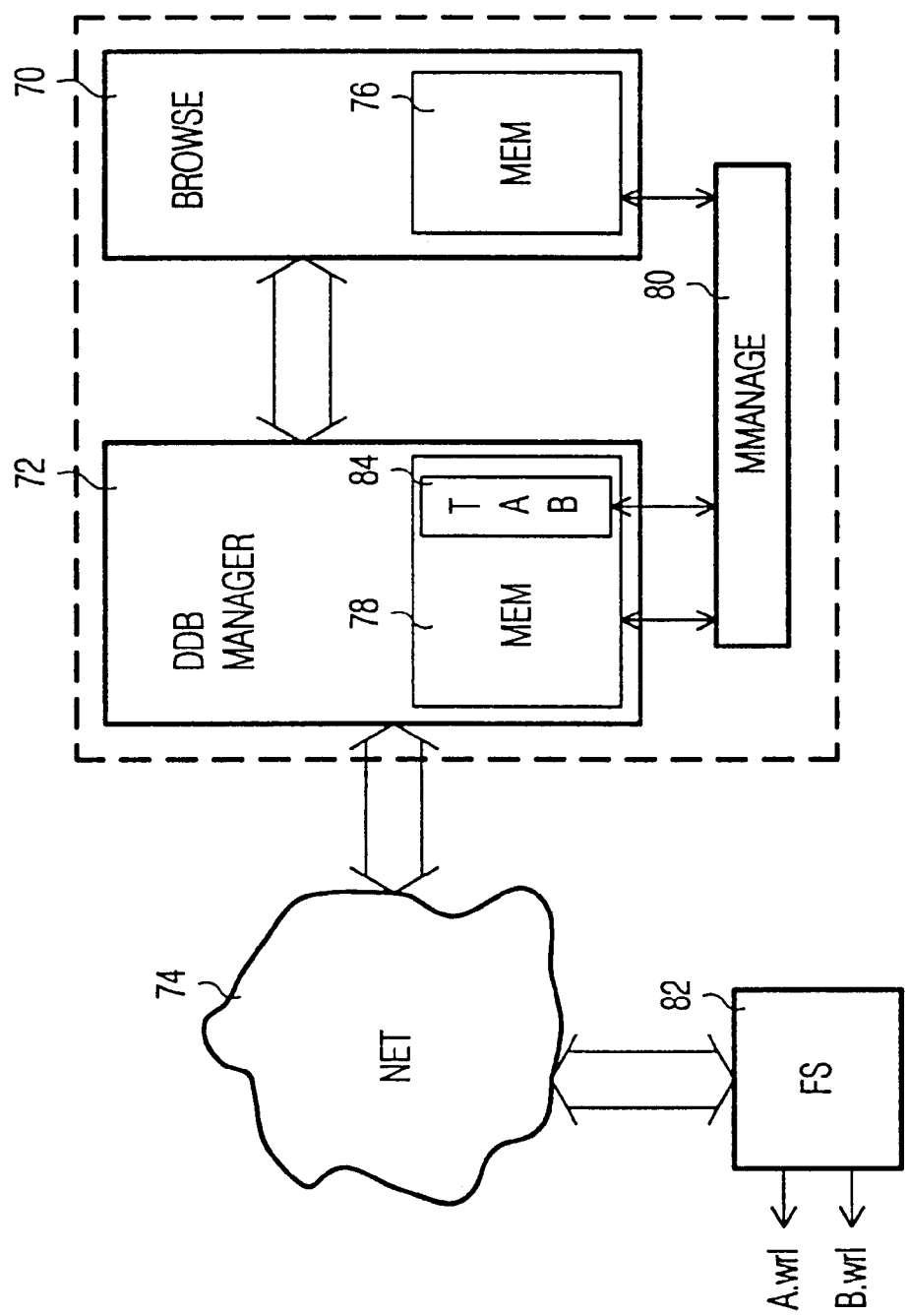
FIG. 3 represents the interaction between the browser of FIG. 2 and a distributed database management system also hosted by the system of FIG. 1.

FIG. 3 represents the interaction between the browser of FIG. 2 (indicated generally at 70) and a further utility supported by the programmed apparatus, namely a distributed database management system 72 which handles the obtaining of VRML files via the network 74. Certain respective areas of system memory 76, 78 are reserved to each of the utilities (for example for the browser asset store 44) and a further utility in the form of a memory management stage 80 is provided to streamline operation of the two principle utilities. In the absence of control from management utility 80, unnecessary duplication of effort could occur, for example in the area of maintaining an updated local graphics database.

In the example shown, the application has two locales A and B, that is to say virtual environment areas of interest that are effectively disparate. For simplicity of illustration, the only assets in these locales are assumed to be graphical assets. The geometry of locale A is described by the file A.wrl, and that of B by B.wrl. If the user is navigating locale A, then the generated view of the virtual environment is based on the contents of A.wrl. These assets (wrl-suffix files) are permanently stored on file-server 82 and accessed via the network 74 by the distributed database management utility 72 for downloading to the browser 70.

With the user in locale A, the browser 70 requires A.wrl to be downloaded, which it then parses and converts into run-time data structures for efficient rendering and simulation. This requires the database manager 72 to fetch A.wrl from the file-server 82 and then forward this to the browser 70: for reasons of efficiency, the database manager 72 also stores a copy of A.wrl in its respective area of memory 78 such that, for frequently required assets or files, there is a good chance of them already being held in the local memory of database manager 72 and thus an access call to obtain the data again from file-server 82 is avoided. Although this arrangement can reduce delays due to accessing, it is wasteful of local memory and accordingly the memory management utility 80 identifies, among the stored data files which have been called up, those which have been passed to the browser 70 and should any shortage of free memory be determined, the utility 80 frees up the memory currently occupied by those files which have already been forwarded.

In order to assist the memory management utility 80, a table 84 is maintained in the system memory (as shown it may be within that part 78 allocated to the database manager 72), with the table 84 containing a list of the files required by the browser 70 and, for each entry, an indication of the file source (for example full title and home file server), an indicator for whether or not the browser has downloaded the file data and stored it in its own area of memory 76, and an indicator (pointer) for the start of the file data within the database managers area of memory 78.

Although defined principally in terms of a software browser implementation, the skilled reader will be well aware than many of the above-described functional features could equally well be implemented in hardware.

From reading the present disclosure, other modifications will be apparent to persons skilled in the art. Such modifications may involve other features which are already known in the design, manufacture and use of image processing and/or data network access apparatus and devices and components parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. Data processing apparatus configured as a virtual environment data browser, the apparatus comprising a processor coupled with at least first storage means and data network interface means capable of receiving data defining a virtual environment and objects therein when coupled to a data network including a source of such data, the apparatus further comprising user input means and being configured to periodically generate an image based on said data defining the virtual environment and objects and from a viewpoint at a location and with an orientation in said virtual environment determined at least partially by input from said user input means; characterized in that further storage means are provided with the apparatus further comprising memory management means configured to place in said further storage means a copy of each data file received via the network, to check within said further storage means for data files before calling for them via the network, and to determine both required and available data storage capacity for at least the first and further storage means of the apparatus and, when the required capacity exceeds a predetermined level, to clear from said further storage means those data files also passed to the first storage means.

2. Apparatus as claimed in claim 1, wherein said memory management means is configured to maintain and periodically update a table identifying, as respective entries in the table, data files required for generation of said image.

3. Apparatus as claimed in claim 2, wherein said memory management means maintains, for each table entry, an indication of the respective data files source.

4. Apparatus as claimed in claim 3, wherein for data files held within memory means of said apparatus, said indication of the respective data files source comprises a memory address for said data file.

5. Apparatus as claimed in claim 3, wherein for data files held at remote locations accessible via said data network, said indication of the respective data files source comprises a network address and such accessing information as is required for acquiring said data file from its respective remote location.

6. Apparatus as claimed in claim 2, wherein said memory management means includes in said table for each entry an indication as to whether or not the respective data file has been stored in the first storage means.

7. Apparatus as claimed in claim 1, wherein said predetermined level is in the range of 60 to 100% of available storage capacity.

8. Apparatus as claimed in claim 7, wherein said predetermined level is 90% of available storage capacity.

* * * * *